United States Patent [19]

Udding

[11] B 3,914,211

[45] Oct. 21, 1975

[54] PROCESS FOR MODIFYING DIENE POLYMERS

[75] Inventor: Anne C. Udding, Amsterdam, Netherlands

[73] Assignee: Shell Oil Company, Houston, Tex.

[22] Filed: Feb. 28, 1973

[21] Appl. No.: 336,652

[44] Published under the Trial Voluntary Protest Program on January 28, 1975 as document no. B 336,652.

[30] Foreign Application Priority Data

Apr. 24, 1972 Netherlands........................ 7205492

[52] U.S. Cl......... 260/94.7 N; 260/80.78; 260/85.1; 260/94.7 A; 260/768

[51] Int. Cl.$^2$.......................................... C08F 8/32

[58] Field of Search............ 260/94.7 N, 94.7 A, 768, 260/84.7, 583 DD

[56] References Cited

UNITED STATES PATENTS 3,341,487   9/1967   Albert............................... 260/84.7

OTHER PUBLICATIONS

Chemical Abstract, Vol. 73, 1970 – 36263j.
Chemical Abstract, Vol. 33, 1939 – 9300.

*Primary Examiner*—William F. Hamrock

[57] ABSTRACT

A process is described for modifying diene polymers with a mono-substituted hydroxyl amine to products having improved mechanical properties in the unvulcanized state.

6 Claims, No Drawings

3,914,211

PROCESS FOR MODIFYING DIENE POLYMERS

This invention relates to a process for modifying diene polymers with mono organo hydroxylamines and to the modified products.

BACKGROUND OF THE INVENTION

Recent developments in the art of polymerization have resulted in the production of many polymers having unsaturated carbon-carbon bonds. Many of these polymers, particularly polymers of diene hydrocarbons such as polyisoprene, have been precluded from many commercial applications by reason of poor processability. This poor processability relates to deficient mechanical properties in the unvulcanized state or "green strength," i.e. stress-strain properties such as tensile strength and elongation at break are very low.

It is possible to modify the polymer to improve these properties by reaction with nitrones which may be formed "in situ" from aldehydes or ketone with a hydroxylamine derivative as described in applicant's copending application Ser. No. 228,231, filed Feb. 22, 1972 now U.S. Pat. No. 3,792,031.

Further, it is known from U.S. Pat. No. 3,432,578 to use certain diaryl or diaralkyl hydroxyl amines as stabilizers against the adverse effect of ultraviolet light for conjugated diene polymers, however, said amines have been found to not improve green strength of the resulting composition.

STATEMENT OF THE INVENTION

It has now been found that diene hydrocarbon polymers can be modified into products which can be processed, together with a filler, to compositions which in the unvulcanized state have improved mechanical properties, by a process which comprises reacting said diene polymer with from about 0.1 to about 5 percent by weight on polymer of a hydroxylamine derivative of the formula

in which R represents an organic radical inert to the modification, in the absence of those aldehydes or ketones which, in situ, form nitrones with said hydroxylamine derivatives.

Surprisingly, it has been found that it is possible to prepare filler containing compositions with a relatively high tensile strength and high elongation at break from the polymers modified according to the present invention. The modified polymers are usually colorless or yellow.

The invention also relates to the preparation of vulcanized products prepared by vulcanization of the modified polymers obtained by reaction of diene hydrocarbon polymers with a hydroxylamine derivative of the above formula. The term "vulcanization" herein refers not only to the vulcanization by means of a sulphur-containing formulation but also to the reaction of polar groups incorporated via the hydroxylamine derivative, such as, for example, carboxyl groups, with metal oxides, metal hydroxides or certain salts in the absence of sulphur, to form ionomers or other cross-linked products. The introduction of polar groups via the hydroxylamine derivative can enhance the suitability of the modified polymer for adhesives, coatings and the like.

DESCRIPTION OF PREFERRED EMBODIMENTS

The hydroxylamines employed in the process of the invention are of the formula

in which R represents an organic radical inert to the modification. R, which may contain up to about 18 carbon atoms, is preferably a hydrocarbyl group or a hydrocarbyl group bearing one or more substituents selected from halogen atoms, and hydroxyl, hydrocarbyloxy, and carboxyl groups. Mono-arylhydroxyl amines up to about 14 carbon atoms and especially phenyl-hydroxyl amines and alkyl-substituted phenyl-hydroxyl amines wherein the alkyl groups having up to about 4 carbon atoms are preferred. Excellent results have been obtained with p-tolylhydroxyl amine and 2,6-dimethylphenylhydroxyl amine. The term "monoaryl" also includes a pyridyl, a thienyl and a furyl group which may also bear one or more substituents, as described. The present process may be carried out with two or more hydroxyl amine derivatives of the above formula.

The unmodified polymer may be reacted with the hydroxylamine derivative in any desired manner. According to a preferred-method the polymer is mixed in the solid state with the hydroxylamine derivative in a mixer at a certain temperature for a certain period of time. The particular temperature and time may vary according to the particular polymer and hydroxylamine derivatives. For this purpose mixers suitable for rubber processing may be used. The mixers may be of the open or closed type. Internal mixers and extruders are examples of suitable closed mixers.

According to another method the polymer is mixed in solution with a hydroxylamine derivative. To this end a wide variety of solvents may be used, for example, $C_{4-9}$ alkanes and alkenes and mixtures thereof. For solution-prepared polymers, the solvent which contains the polymer immediately after its preparation may be used. If desired, the reaction with the polymer may be carried out during or after removal of the solvent, or, for example, when the polymer is being dried if the solvent has been removed by means of steam. Alternatively, the resultant mixture of polymer and hydroxylamine derivative may be reacted in the solid state in a mixture, for example on a rolling mill.

The process according to the invention is not limited to a certain temperature range and is preferably carried out between 20° and 170°C. It has been found that the said stress-strain properties are greatly improved, especially when the process is carried out in the temperature range between 50° and 125°C, i.e., in a relatively low temperature range, in which there is little or no problem with product degradation. The unmodified polymer may be reacted with the hydroxylamine derivative at a temperature below, equal to or higher than the melting point of the derivative. If desired, it is possible to modify the polymer at as low as possible a temperature by using a hydroxylamine derivative in a eutectic or substantially eutectic composition with another hydroxylamine derivative, which derivatives both have the above-mentioned structure, at a temperature, equal to or just above, for example, 0°–10°C above the melting point of this mixture. An example of this is a mixture of phenylhydroxylamine and p-tolylhydroxylamine of eutectic composition.

The quantity of the hydroxylamine derivative which may be employed in the process of the invention is from about 0.05 to about 5 percent by weight, and preferably not more than 1.5 percent by weight, based on unmodified polymer; most preference being given to quantities amounting to 0.1–1.0 percent by weight of the quantity of unmodified polymer.

The process according to the invention is especially applicable to homopolymers or copolymers of dienes, in particular isoprene polymers and preferably those isoprene polymers, which have been prepared by means of lithiumhydrocarbyl compounds as initiator, since the filler-containing compositions of the latter polymers have a very low tensile strength and a low elongation at break. The process according to the invention can, however, also be applied to other diene polymers, such as, for example, polybutadiene and styrene/butadiene copolymers, irrespective of the catalyst system and medium used in their preparation. The present process may also be used for the modification of predominately alkene polymers into which unsaturated moieties have been incorporated, by causing an unconjugated diene to take part in the polymerization as comonomer during the preparation of these polymers, in particular by ter-polymerization of ethylene, propylene and—as the third monomer—for example dicyclopentadiene, 5-methylenenorbornene-2, 5-ethylidenenorbornene-2, 1.5-cyclooctadiene or 1,4-hexadiene. The unconjugated diene may comprise from about 1 to about 25 percent of the resulting terpolymer. Finally, the invention most suitably relates to the modification of those diene hydrocarbon polymers of which the intrinsic viscosity, as measured in toluene at 25°C, is at least 3 dl/g.

Although the modification reaction according to the invention yields the best results if it is carried out before the addition of reinforcing fillers and one or more other ingredients of the vulcanization recipe, the present hydroxylamine derivatives may, if desired, be reacted with the polymers in the presence of reinforcing fillers and in the presence or absence of one or more of the other ingredients mentioned, such as, for example, zinc oxide and stearic acid (provided, however, that the reaction is carried out above 90°C, in the absence of sulphur and accelerators).

The invention will be illustrated with reference to the Examples.

EXAMPLES

The diene hydrocarbon polymer starting material was a polyisoprene prepared by means of sec. butyllithium as initiator. This polyisoprene contained 0.15 percent by weight of 2,6-ditert.butyl-4-methylphenol as antioxidant and had an intrinsic viscosity in toluene at 25°C of 7.0 dl/g and a Hoekstra plasticity of 71. The Hoekstra plasticity was determined as described in the article in "Rubber and Plastics Age" 42 (1961), 1,079–85 by E. W. Duck and J. A. Waterman, by means of a plastometer, which is described in "Proceedings Rubber Technology Conference," London, 1938, Paper No. 63, page 362, by J. Noekstra.

The preparation of the modified polyisoprene and of the unvulcanized, filler-containing compositions is described in each of the Examples proper. After the unvulcanized filler-containing compositions had been stored for 18–24 hours at 20°C, 0.15 cm thick test plates were prepared therefrom by pressing at 80°C for 5 minutes. After these unvulcanized plates had been stored at 20°C for 18–24 hours the tensile strength (green strength) and elongation at break were determined by means of stress-strain tests. For this purpose use was made of strips which had been punched from the test plates by means of a 1 cm wide die and which were tested in accordance with ASTM Standard D 412/68 for vulcanized rubbers. The tensile strength and elongation at break of the original, unmodified polyisoprene are given in the top line of Table A.

The gel content of the polymer was determined as follows: a quantity of 0.5 g of polyisoprene was stirred with 100 ml of n-pentane at 20°C for 4 hours. The material was then centrifuged for 45 minutes whereupon the precipitate separated was stirred with 100 ml of n-pentane at 20°C for 4 hours. Subsequently, the material was again centrifuged for 45 minutes whereupon the resultant precipitate was dried at 40°C. The gel content in percent by weight equals 200 times the weight in grams of the dried precipitate.

EXAMPLE I

Polyisoprene was introduced into a Brabender plastograph where it was kept at 125°C for 8 minutes during a blank experiment (experiment 1), the rotor speed being 56 rpm. The polyisoprene thus treated was cooled to ambient temperature and the Hoekstra platicity of the cooled polyisoprene was determined.

Compositions were prepared from the polyisoprene on a Schwabenthan mill at a temperature between 60° and 70°C; these compositions were formulated as follows (expressed in parts by weight):

| | |
|---|---|
| polyisoprene | 100 |
| sulphur | 2.25 |
| zinc oxide | 5.0 |
| stearic acid | 3.0 |
| HAF[1] carbon black | 50 |
| Flectol H[2] | 1.0 |
| Santoflex 13[3] | 1.0 |
| Santocure[4] | 0.9 |

[1] high abrasion furnace black.
[2] trade name for polymerized trimethyl dihydroquinoline obtained by reaction of aniline with acetone.
[3] trade name for N-isopropyl-N'-phenylparaphenylene diamine.
[4] trade name for N-cyclohexyl-2-benzothiazole sulphene amide.

The tensile strength and elongation at break of the test plates are stated in Table A under experiment 1.

Experiments 2 and 3 were carried out in the same manner as experiment 1, except that quantities of 0.37 percent by weight and 0.74 percent by weight respectively of phenylhydroxylamine were added to the polyisoprene before the Brabender plastograph was started; also the intrinsic viscosity in toluene at 25°C of the modified polyisoprene was also determined. The modified polyisoprene was colorless. The gel content in n-pentane of the reaction products was lower than 1 percent weight. Table A specifies the tensile strength and elongation at break of the test plates of the filler-containing compositions.

Table A

| Test No. | Phenylhydroxy-amine, %w | Hoekstra plasticity | Intrinsic viscosity in toluene 25°C, dl/g | Unvulcanized composition tensile strength kg/cm² | elongation at break, % |
| --- | --- | --- | --- | --- | --- |
| — | without | 71 | 7.0 | 1.0 | 230 |
| 1 | without | 35 | — | 2.7 | 1070 |
| 2 | 0.37 | 62 | 3.4 | 10 | 780 |
| 3 | 0.74 | 66 | 1.9 | 16 | 620 |

EXAMPLE II

In the experiments 4–11 polyisoprene was modified at four different temperatures and at each temperature with two quantities of phenylhydroxylamine. Table B shows the temperature and the quantity of phenylhydroxylamine used for modification. Experiments 4 and 5 were carried out on a Schwabenthan mill and experiments 6–11 in a Brabender plastograph. The recipe and the preparation methods of the compositions were the same as those described in Example I. Table B also gives four properties of the modified polyisoprene and two of the still unvulcanized filler-containing compositions.

vulcanized by heating them under pressure in a mold at 145°C for the number of minutes stated in Table C.

In experiments 18–20 polyisoprene and hydroxylamine were introduced into a Brabender plastograph and mixed therein at 120°C for 0.5 minute. Subsequently, the following materials were supplied to the plastograph in the percentages specified (based on polyisoprene):

| HAF carbon black | 25 |
| --- | --- |
| zinc oxide | 5 |
| stearic acid | 3 |
| Flectol H | 1 |
| Santoflex 13 | 1 |

Table B

| Exp. No. | Temp., °C | Phenyl-hydroxyl-amine %w | Color-modified poly-isoprene | Hoek-stra plas-ticity | Intrinsic viscosity in toluene 25°C dl/g | Gel % by Weight | Unvulcanized Composition Tensile strength kg/cm² | Elongation At break, % |
| --- | --- | --- | --- | --- | --- | --- | --- | --- |
| 4 | 75 | 0.5 | )color- | 54 | — | — | 16 | 860 |
| 5 | 75 | 0.8 | )less | 50 | 2.3 | <1 | 19 | 510 |
| 6 | 110 | 0.5 | yellow | 60 | — | — | 16 | 750 |
| 7 | 110 | 0.8 | yellow | 63 | — | — | 16 | 450 |
| 8 | 130 | 0.5 | yellow | 65 | — | — | 14 | 430 |
| 9 | 130 | 0.8 | yellow | 68 | 2.2 | 1 | 11 | 360 |
| 10 | 150 | 0.5 | yellow | 60 | — | — | 9 | 650 |
| 11 | 150 | 0.8 | yellow | 50 | 2.5 | 1 | 18 | 790 |

\* rotor speed 56 rpm

EXAMPLE III

In experiments 12–20 phenylhydroxylamine (FHA), p-tolyl hydroxylamine (THA) and dibenzylhydroxylamine (DBHA), (not according to the invention) were compared to a diarylhydroxylamine as modifiers for polyisoprene. A quantity of 0.6 percent by weight of hydroxylamine was used in all cases. Table C gives the mixer used in the modification and for experiments 12–17 the temperature at which and the time during which the material was modified. The formulations and preparation methods of the compositions in experiments 12–17 were the same as those stated in Example I. Table C also shows three properties of the modified polyisoprene and the tensile strength and the elongation at break of the unvulcanized compositions. The table also contains three properties of the vulcanized compositions. The unvulcanized compositions were Subsequently the plastograph was operated for 1 minute, whereupon another quantity of 25 percent HAF carbon black (based on polyisoprene) was added and the material was mixed again for 3.5 minutes. At the end of this 3.5 minute period the temperature of the composition had risen to 140°C and the composition was transferred to a Schwabenthan mill and mixed therein at a temperature between 60° and 70°C with 2.25 percent by weight of sulphur (based on polyisoprene) and 0.9 percent by weight of Santocure (based on polyisoprene). From the resultant three filler-containing unvulcanized compositions test plates were made which had the tensile strength and elongation at break stated in Table C. Subsequently, the compositions were vulcanized in the same manner as stated in experiments 12–17. Table C also states three properties of the vulcanized compositions.

Table C

| Exp. No. | Mixer, temp. and period | Hydroxyl-amine | Hoekstra plasticity | Intrinsic viscosity, toluene | Gel % w |
|---|---|---|---|---|---|
| 12) | Schwabenthan | FHA | 39 | 1.4 | 1 |
| 13) | mill, 60–70°C, | THA | 38 | 2.3 | 0 |
| 14) | 3 minutes | DBHA 1) | 47 | 4.7 | 0 |
| 15) | Meili mixer 4) | FHA | 40 | 1.7 | 0 |
| 16) | 120°C, 5 min. | THA | 21 | 2.2 | 0 |
| 17) |  | DBHA 1) | 63 | 5.3 | 0 |
| 18) | Brabender | FHA |  |  |  |
| 19) | plastograph 5) | THA |  |  |  |
| 20) |  | DBHA 1) |  |  |  |

| Exp. No. | Unvulcanized composition tensile strength kg/cm² | Unvulcanized composition elongation at break,% | Optimal vulcanization time 2) min. | Vulcanized Composition 3) modulus, 300% kg/cm² | Vulcanized Composition 3) tensile strength kg/cm² | Vulcanized Composition 3) elongation at break, % |
|---|---|---|---|---|---|---|
| 12) | 16.3 | 630 | 15 | 162 | 290 | 470 |
| 13) | 17.6 | 840 | 14.5 | 148 | 305 | 520 |
| 14) | 1.4 | 450 | 11.5 | 133 | 305 | 520 |
| 15) | 8.8 | 835 | 11 | 143 | 260 | 490 |
| 16) | 6.0 | 850 | 9.5 | 124 | 258 | 560 |
| 17) | 0.3 | 290 | 10 | 117 | 264 | 580 |
| 18) | 4.9 | 410 | 17.5 | 145 | 309 | 525 |
| 19) | 6.2 | 340 | 14 | 150 | 290 | 510 |
| 20) | 2.6 | 270 | 12.5 | 112 | 340 | 660 |

1) not according to the invention
2) determined by means of a Monsanto rheometer
3) determinations according to ASTM Standard D-412/68. For the production of the test plates die D was used in experiments 12, 13, 14, 18, 19 and 20 and die C in experiments 15, 16 and 17.
4) the high-speed rotor had a speed of 60 rpm and the low-speed rotor had a speed of 36 rpm.
5) the rotor speed was 56 rpm.

EXAMPLE IV

A quantity of 0.5 percent by weight of p-tolylhydroxylamine (based on polyisoprene) was added to a 7 percent by weight solution of polyisoprene in amylene, which also contained 2 percent by weight of isoprene (based on amylene) and 0.15 percent by weight of 2.6-ditert.butyl-4-methylphenol, whereupon the material was stirred at 40°C for 30 minutes. The solvent was subsequently removed while steam was being passed through and the resultant residue was dried at 40°C under sub-atmospheric pressure. Compositions were prepared from the dried residue in the manner described in Example I. The modified polyisoprene was yellow and had a Hoekstra plasticity of 26. The unvulcanized composition had a tensile strength of 7.0 kg/cm² and an elongation at break of 810 percent. The unvulcanized composition was vulcanized under pressure in a mold at 145°C. The optimal vulcanization time, determined by means of a Monsanto rheometer, was 15 minutes. The vulcanizate had the following properties:

| | | |
|---|---|---|
| modulus, 300% | 138 | kg/cm²) |
| tensile strength | 327 | kg/cm²) ASTM Standard D-412/68, |
| elongation at break | 610% | ) die D |
| permanent set | 24% | ) |

EXAMPLE V

Polyisoprene was mixed with 0.5 percent by weight of 2.6-di-methylphenylhydroxylamine in a Meili mixer at 100°C for 4 minutes. The polyisoprene thus modified was colorless and had a Hoekstra plasticity of 64. The compositions prepared from the modified polyisoprene in the manner described in Example I, had a tensile strength of 10 kg/cm² and an elongation at break of 650 percent.

What is claimed is:

1. A process for modifying polyisoprene into products which can be processed with a filler to unvulcanized polymers having improved mechanical properties which process comprises reacting said polymer with from about 0.05 to about 5 percent by weight on polymer of a mono aryl hydroxylamine derivative of up to fourteen carbon atoms in the absence of those aldehydes or ketones which, in situ, form nitrones with the said hydroxylamine derivatives, at a temperature from about 50°–125°C.

2. A process as in claim 1, wherein the hydroxylamine derivative is phenylhydroxylamine.

3. A process as in claim 1 wherein the hydroxylamine derivative is an alkyl-substituted phenylhydroxylamine.

4. A process as in claim 3, wherein the hydroxylamine derivative is selected from p-tolylhydroxylamine and 2,6-dimethylphenylhydroxylamine.

5. A process as in claim 1, wherein the amount of hydroxylamine derivative with which the polymers are reacted varies from about 0.1 to about 1.0 percent by weight.

6. A process as in claim 1 wherein the polymer has an intrinsic viscosity of at least 3 dl/g, as measured in toluene at 25°C.

* * * * *